United States Patent [19]

Sainsbury

[11] Patent Number: 4,590,920
[45] Date of Patent: May 27, 1986

[54] FOCUSSING SOLAR COLLECTOR

[76] Inventor: Garrett M. Sainsbury, 10 Waratah Avenue, Dalkeith, Western Australia, Australia

[21] Appl. No.: 610,846

[22] Filed: May 16, 1984

[30] Foreign Application Priority Data

May 17, 1983 [AU] Australia .................. PF9404

[51] Int. Cl.⁴ .................................. F24J 3/02
[52] U.S. Cl. ................... 126/425; 126/424; 126/439
[58] Field of Search ........... 126/424, 425, 439, 440, 126/451; 353/3; 350/289, 628, 629, 630, 631, 632, 636

[56] References Cited

U.S. PATENT DOCUMENTS

| | | | |
|---|---|---|---|
| 787,145 | 4/1905 | Brown | 126/425 |
| 2,945,417 | 7/1960 | Caryl et al. | 353/3 |
| 2,976,533 | 3/1961 | Salisbury | 126/424 |
| 3,171,403 | 3/1965 | Drescher | 126/425 |
| 4,011,854 | 3/1977 | Brantley et al. | 126/425 |
| 4,084,581 | 4/1978 | Vigoureux | 126/438 |
| 4,170,985 | 10/1979 | Authier | 126/424 |
| 4,171,876 | 10/1979 | Wood | 126/424 |
| 4,173,213 | 11/1979 | Kelly | 126/425 |
| 4,195,620 | 4/1980 | Rust | 126/425 |
| 4,211,211 | 7/1980 | Toomey et al. | 126/443 |
| 4,249,516 | 2/1981 | Stark | 126/439 |
| 4,295,621 | 10/1981 | Siryj | 126/425 |
| 4,333,446 | 6/1982 | Smyth | 126/425 |
| 4,354,484 | 10/1982 | Malone et al. | 126/425 |
| 4,356,812 | 11/1982 | Haven | 126/425 |
| 4,402,306 | 9/1983 | McElroy, Jr. | 126/437 |
| 4,458,670 | 7/1984 | Lhenry | 126/439 |
| 4,491,125 | 1/1985 | Sainsbury | 126/424 |
| 4,509,501 | 4/1985 | Hunter | 350/632 |

Primary Examiner—Margaret A. Focarino
Assistant Examiner—H. A. Odar
Attorney, Agent, or Firm—Harness, Dickey & Pierce

[57] ABSTRACT

A solar collector comprising a substantially hemispherical reflector a collecting arrangement supported above the reflector be pivotable about the center of curvature of the reflector, one end of said collecting arrangement being slidably supported on a part circular support pivotally mounted at one point to the reflector below the center of curvature of the reflector and slidably supported by said reflector at a second point spaced from said one point to be movable along a circular horizontally disposed path around said reflector, a first drive means provided to maintain the collecting arrangement at a declination corresponding to the declination of the sun and second drive means to cause rotation of said part circular support to maintain the inclination of the collecting arrangement in correspondence to the inclination of the sun.

19 Claims, 6 Drawing Figures

FOCUSSING SOLAR COLLECTOR

This invention relates to solar collectors and in particular to a tracking mechanism of a focussing solar collector of the hemispherical bowl type, having either a linear focus or point focus.

In existing collectors of the linear focus type the solar energy concentrated by the bowl is received by a collector (which in many cases is a boiler or like heat exchanger) located along the line focus of the reflector which extends from near the hemispherical reflecting surface to near the paraxial focus at half the radius of the hemisphere.

The collector is mounted in a frame which in turn is swung from an inclined central support shaft in a gimbal mounting so that at all times the axis of the boiler passes through the centre of curvature of the hemisphere. The central support shaft is fixed permanently in a North-South alignment at an angle of inclination equal to the latitude of the site.

Tracking consists of keeping the axis of the collector aligned with the centre of the sun during the course of the day to constantly collect the solar radiation concentrated at the linear focus of the hemisphere.

This alignment is effected by rotating the collector on a rotation axis co-incident with the axis of the central support shaft at the same speed as the earth rotates with respect to the sun. In addition, the collector is swung on an axis at right angles to the rotation axis (the swing axis) to maintain the angle between the collector axis and the rotation axis equal to the declination of the sun as it changes with the seasons. To give effect to this, two separate drive trains are required at the centre of the bowl, one for rotation and one for swing.

Each drive train must be reversible and must be capable of slow movement for normal tracking and fast repositioning. The drives are controlled by sensors that detect misalignment.

Another form of the solar collector utilises a secondary reflection surface to redirect radiation reflected from the hemisphere to a boiler situated at the centre of curvature of the hemisphere. The drive mechanism requirements of this form of collector are similar to those of the linear focus collector. In the latter it is the boiler axis which must be maintained in alignment with the centre of the sun whereas in the former it is the secondary reflector. In both collectors the bowl remains stationary.

The problems with existing drive arrangements are:

1. The drive trains at the centre of the bowl are complicated and relatively inaccessible.
2. Alignment is difficult to maintain because a small movement of the drive train results in a large movement of the boiler or secondary reflector. This can result in hunting and spillage (i.e. radiation missing the target).
3. Since there is no connection between the bowl and the linear collector or secondary reflector, the correct spatial relationship between the two is difficult to maintain under windy conditions.

The objects of this invention are to remove the rotation drive mechanism from the centre of the bowl, to make the movement of the linear boiler or secondary reflector less sensitive to movement of the drive trains; and to provide a means of maintaining the linear boiler or secondary reflector in the correct spatial reltionship to the bowl.

In one form the invention resides in a solar collector comprising a substantially hemispherical reflector a collecting arrangement supported above the reflector to be pivotable about the centre of curvature of the reflector, an end of said collecting arrangement being movably supported on a semi circular support pivotably mounted at one point to the reflector below the centre of curvature of the reflector and slidably supported by said reflector at a second point spaced from said one point to be movable along a circular horizontally disposed path around said reflector, a first drive means provided to maintain the collecting arrangement at a declination corresponding to the declination of the sun and second drive means to cause rotation of said semi circular support to maintain the inclination of the collecting arrangement in correspondence to the inclination of the sun.

In another form the invention relates to a solar collector comprising a substantially hemispherical reflective concave surface; wherein the diametric axis of the surface is inclined at an angle from the horizontal substantially equal to the angle of latitude of the location of the solar collector and the lower portion of the surface is fixed while the upper portion can rotate over the lower portion, a drive being associated with the upper portion such that said surface is substantially constantly directed towards the sun during its movement; a caustical conical concentrator located at the focus of the hemisphere and having a concentrated second focus for radiation reflected onto its surface from said hemisphere, a collector located at the second focus, said caustical conical concentrator being mounted to rotate about a substantially North-South axis passing through said second focus and being driven by the drive such that the caustical conical concentrator is movable around the lower portion as a result of movement of the upper portion and is capable of relative upward movement over the surface and such that with movement of the sun, incident solar radiation is constantly directed at said second focus.

According to a preferred feature of the invention, the second focus is located at the centre of curvature of the surface.

According to a further preferred feature of the invention said caustical conical concentrator is rotatable about an East-West axis and is capable of being driven by a second drive to maintain the austical conical concentrator at said first focus as the sun varies its declination.

According to a preferred feature of the invention, the caustical conical concentrator is associated with a refractive and/or reflective concentrator mounted to the other side of the second focus in opposed relation with the caustical conical concentrator and having as its focus the second focus.

The invention will be more fully understood in the light of the following description of one specific embodiment. The description is made with reference to the accompanying drawings of which:

Figure 1:
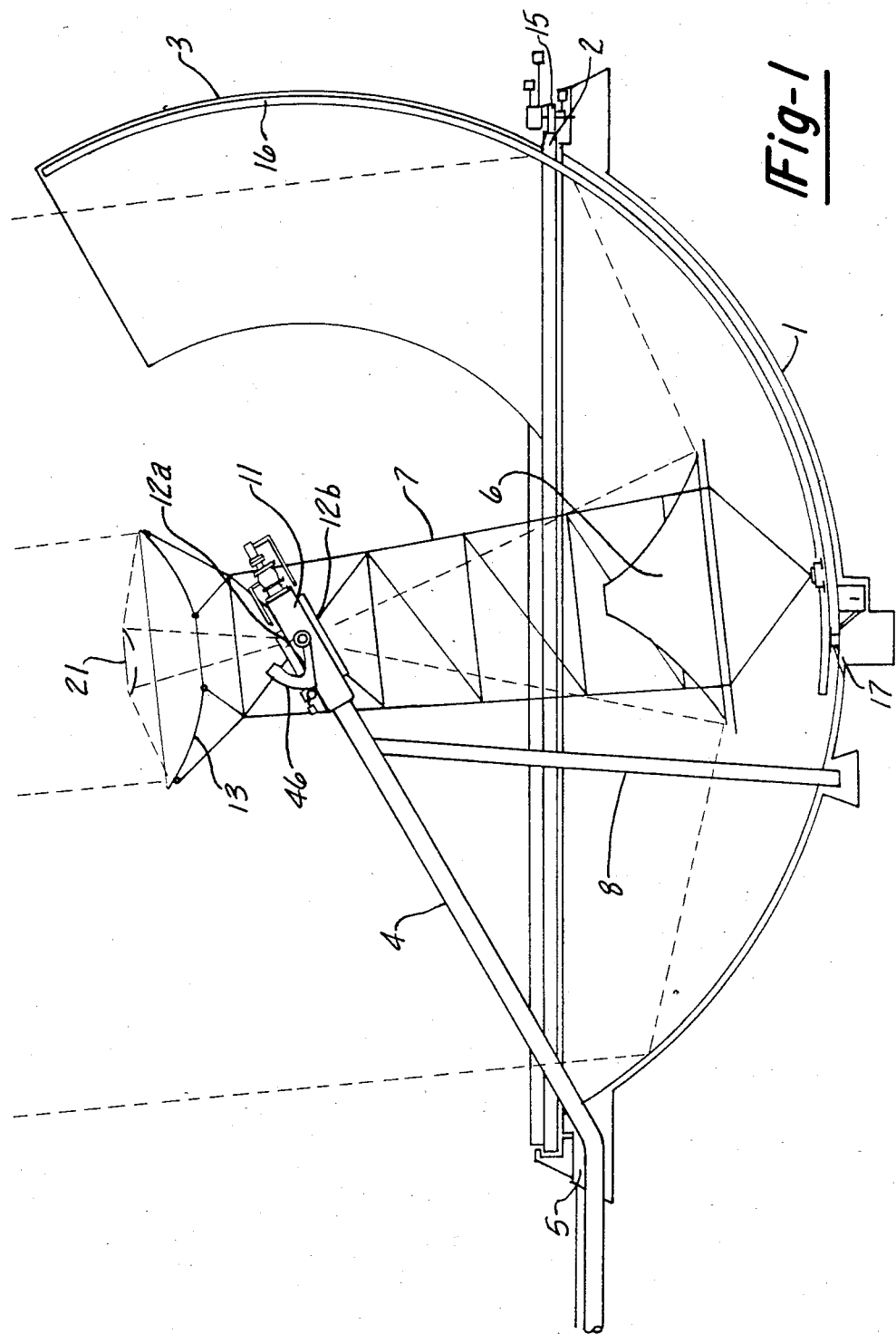
FIG. 1 is a schematic sectional elevation of the embodiment.

The embodiment shown in the drawings relates to a solar collector of the form disclosed in International Application PCT/AU83/00185, the corresponding U.S. application of which has now issued as U.S. Pat. No. 4,491,125 on Jan. 1, 1985, and consists of a substantially hemispherical reflector with its open diametric face inclined to the horizontal at an angle equal to the latitude of the site. The reflector comprises in part a bowl 1 having a horizontal edge. A shell 3 forms the remaining part of the reflector which extends above ground level separate from the bowl 1 in the ground and can revolve around a vertical axis through the centre of curvature of the hemisphere over the horizontal edge of the bowl. The shell has a drive ring 2 around its lower periphery. The sides of the shell are cut away.

A heat exchanger is located at the centre of the hemisphere and comprises a pair of collectors 12a and 12b mounted to each side of a sleeve 11 which is rotatably mounted to a support 4 which extends from the edge of the bowl 1, along the diametric axis of the hemisphere to the centre of the hemisphere. The support defines an insulated jacket which accomodates in a concentric arrangement the cool liquid inlet pipe and the heated liquid outlet pipe. The collectors are connected to the inlet and outlet pipe through connectors which are rotatable over the inlet and outlet pipe and which are accommodated with suitable seals. The support 4 is aligned North-South such that the inlet and outlet pipes pass out of the hemisphere slightly below ground level. At ground level the support is fixed by a concrete collar 5 which surrounds the bowl and is supported above the hemisphere by suitable columns and struts 8.

The sleeve 11 carries a diametric truss 7 which can rotate around the central axis of the support and can also swing on an axis co-incident with the East-West diametric axis of the hemisphere (the swing axis). A reflecting caustic correction cone 6 is located at one end of the truss adjacent the reflective face of the hemisphere and a paraboloid 13/hyperboloid 21 combination (a counterweight collector) is located at the other end. The curvature of the caustic correction cone 6 is such that solar radiation reflected from the hemisphere will impinge on the cone 6 and is reflected to the lower collector 12b of the heat exchanger. The cone is shadowed from direct radiation from the sun by the annular paraboloid reflector 13 which reflects the radiation to a central hyperboloid reflector 21 which in turn reflects the radiation through the centre of the annular paraboloid 13 to the upper collector 12a of the heat exchanger.

The collectors are each accomodated in a heat shroud having windows 9 formed of fused silica through which radiation from the cone and the counterweight collector passes. The space between the collectors and the shroud is preferably evacuated and the interior of the opaque portion of the shroud is preferably silvered or is suitably reflective.

In operation the axis of the truss 7 supporting the cone 6 and counterweight collector system 13 and 21 is kept aligned with the centre of the sun during the course of the day. This is done by rotating the truss 7 about the principal axis at a speed substantially equal to the rate of rotation of the earth with respect to the sun and maintaining the angle between the principal axis and the cone counterweight axis essentially equal to the declination of the sun by periodically swinging the truss on the swing axis. As disclosed previously the caustic correction cone 6 and the paraboloid/hyperboloid combination 13 and 21 are mounted on opposite ends of truss 7 which can be swung on the swing axis passing through the centre of curvature of the hemisphere and at right angles to the centre line of the support 4. The truss can also rotate about the principal axis corresponding to the centre line of the support 4.

Figure 6:
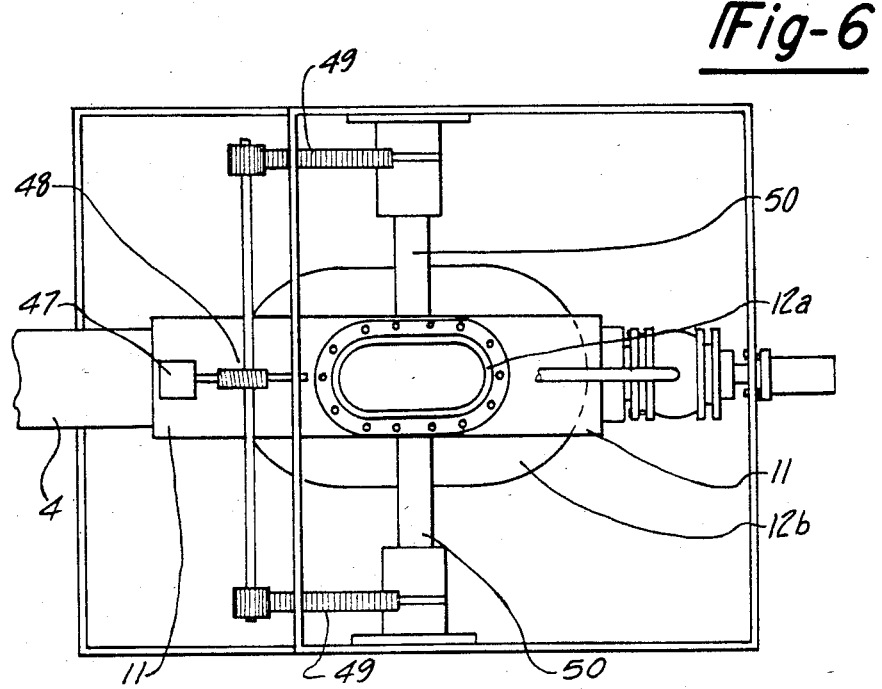

The above movements are achieved by first providing on the sleeve a diametrically opposed pair of pins 50 (see FIG. 6) which project from the sleeve perpendicular to the principal axis. The truss swings on bearings on these pins. This is a type of equatorial mounting and provides a simple means of keeping the axis of the truss and thus the cone and paraboloid/hyperboloid combination aligned with the sun at all times.

During the course of the day the shell 3 is moved on rollers 44 (see FIG. 4) around the horizontal rim of the bowl 1 by engagement of a drive wheel 15 against the drive ring 2 so that it is essentially facing the sun at all times. The shell 3 controls the movement of the truss 7 through a quadrant support 16 which is pivotably mounted to the bottom 17 of the bowl 1 at a point vertically below the heat exchanger and is slidably fixed to the drive ring 2 around the lower edge of the shell 3 to lie concentrically above the surface of the hemisphere. The quadrant support 16 can be lockably engaged with the drive ring 2 to be able to move over the surface of the bowl 1 with movement of the shell.

Figure 4:
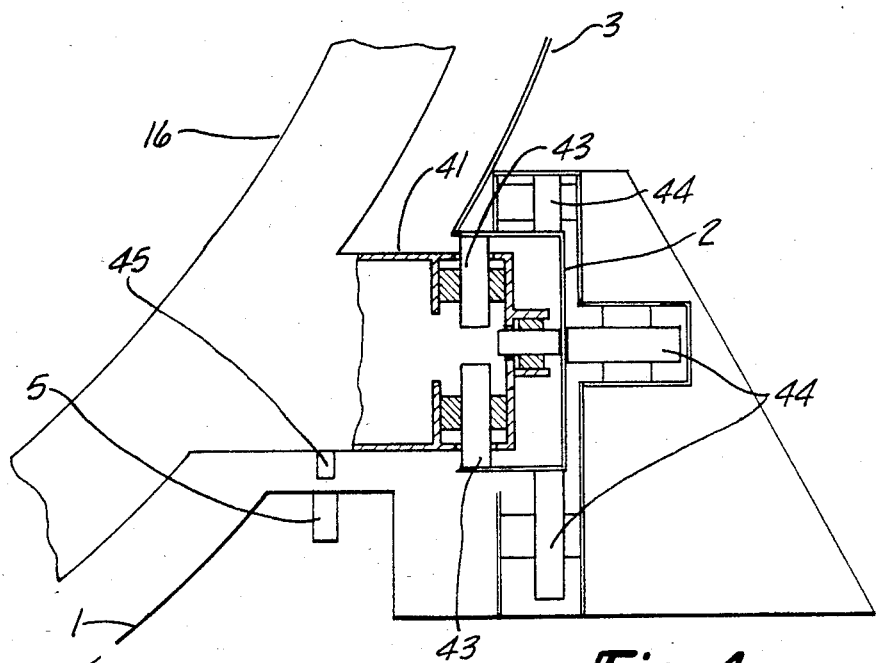
FIG. 4 is a cross-sectional elevation of the mounting of the quadrant support to the drive ring.

The nature of the mounting of the quadrant support 16 to the drive ring is illustrated at FIG. 4. The quadrant support 16 is formed with an extension 41 which is slidably received in a channel formation around the lower edge of the shell 3 which constitutes the inner face of the drive ring 2. The extension 41 is supported by rollers 43 in the channel formation. The drive ring is itself supported from the bowl 1 by rollers 44. The extension 41 supports two solenoid operationed pins whereby one pin 45 can be selectively engaged with the fixed bowl 1 to prevent relative movement between the quadrant support 16 and the bowl 1, and the shell 3. The other pin (not shown) can be selectively engaged with the drive ring 2 to prevent relative movement between the quadrant support 16 and the shell 3.

Figure 3:
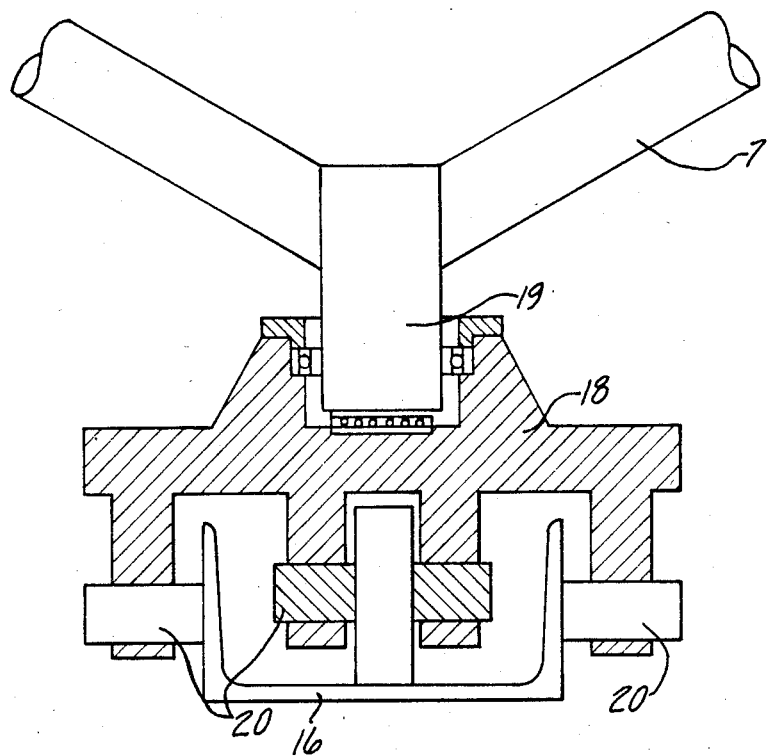
FIG. 3 is a part sectional elevation of the mounting of the diametric truss to the quadrant support.

The truss 7 is mounted to the quadrant support 16 through a slider 18 (see FIG. 3) which is pivotally mounted through a pivot pin 19 to the lower end of the truss 7 and is slidably received on the quadrant support 16. The quadrant support has a channel shaped cross-section and the slider 18 is supported in the quadrant support 16 by rollers 20 which engage the base and flanges of the channel.

Figure 5:
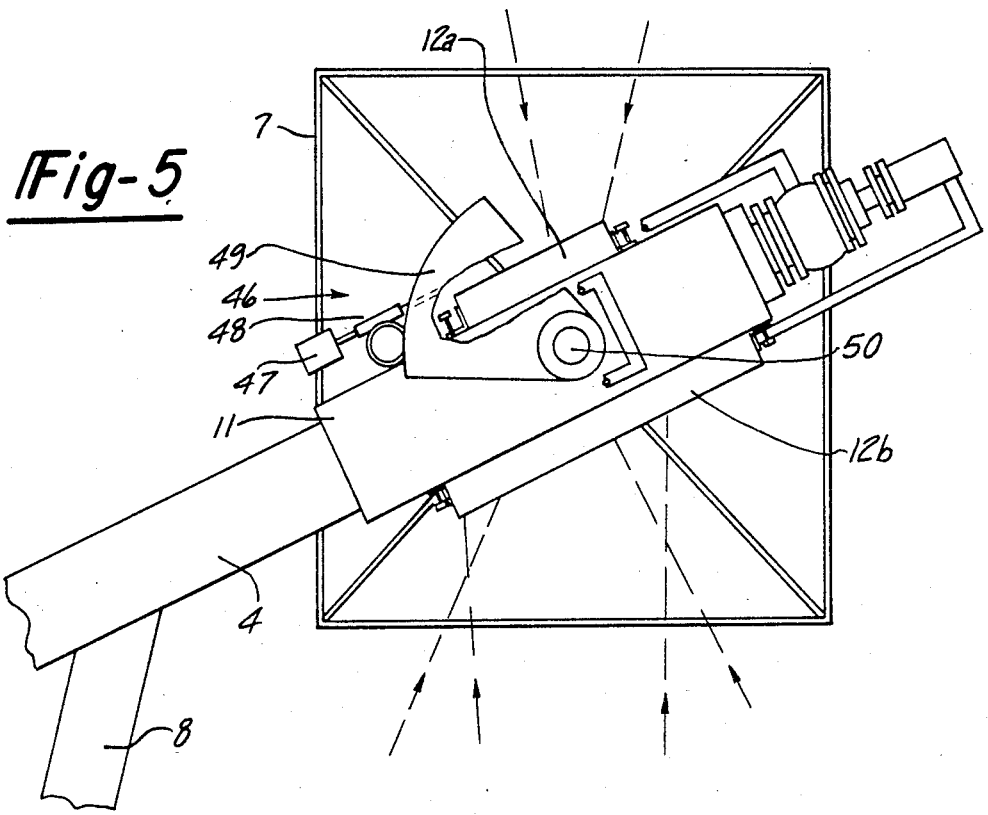
FIGS. 5 and 6 are elevational and plan views and respectively of a form of declination adjustor.

The truss 7 is maintained in substantially constant angular orientation to the North-South axis through a declination adjustor 46 between the sleeve 11 and the truss 7. During the year the declination of the truss 7 is varied in accordance with the suns declination by means of the declination adjustor. The drive for the declination adjustor may take any suitable form including the form shown at FIGS. 5 and 6 and which comprises a sensor controlled reversible step motor 47 mounted to the sleeve 11 which through its drive shaft drives a worm gear 48 meshingly engaged through a transverse gear with a quadrant gear 49 mounted to the truss and rotatbly received on the transverse pins 50 of the sleeve 11.

When the quadrant support 16 is fixed to the drive ring 2, the slider 18 is caused to slide over the quadrant support 16 as the shell rotates on the bowl due to the fixed declination of the truss. When the quadrant support 16 is in the East-West plane at sunrise the slider 18 will be near the top of its daily travel on the quadrant support 16. When the quadrant support 16 is in the North-South plane at noon the slider 18 will be at the lowest point of its daily travel on the quadrant support 16 as shown at FIG. 1. Towards sunset the slider 18 will return to its highest limit of its daily travel on the quadrant support 16.

Figure 2:
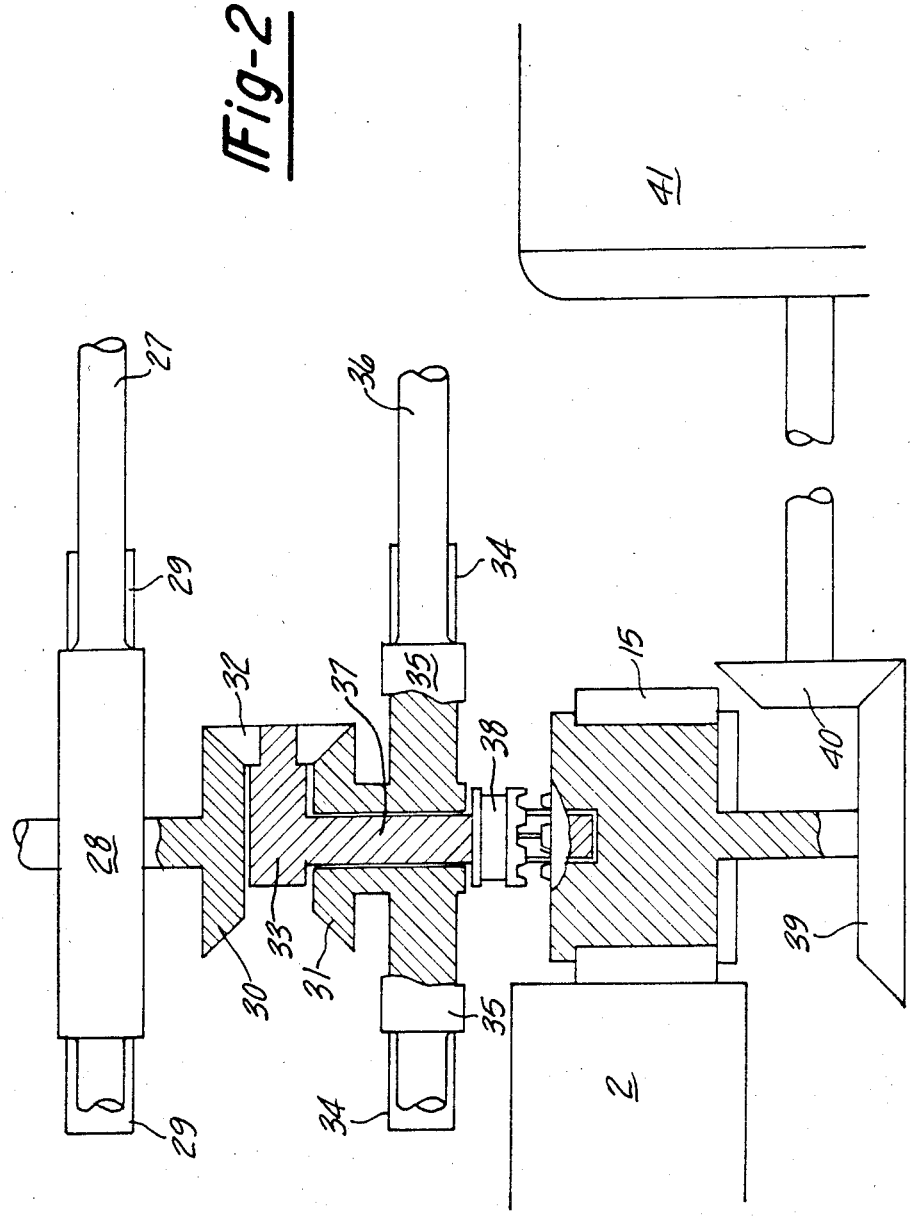
FIG. 2 is a schematic diagram of the drive for the embodiment.

To effect movement of the shell 3 over the bowl 1, precise forward and backward slow motion control is necessary, and a means of rapid re-positioning is also required. A means of effecting such movement is shown at FIG. 2.

The slow motion drive is, provided by two electric motors (not shown) one for forward drive and one reverse drive which drive input shafts 27 and 36. Shaft 27 drives a first worm 28 meshingly engaged with a worm wheel 29 which is connected to a sun gear 30 of an epicyclic gear train comprising an annulus gear 31 and planetary gears 32 attached to yoke 33. The annulus gear 31 is similarly attached to a second worm wheel 34 which is driven by a second worm 35 at the end of the drive shaft 36 of the reversing electric motor. The yoke 33 is mounted to a shaft 37 which is splined at its free end and is free to rotate in a recess formed in an axial face of a drive wheel 15 in driving engagement with the drive ring 2.

A dog clutch 38 moves over the splines and can engage and disengage teeth around the recess in the drive wheel. A shaft integral with the drive wheel 15 carries a first bevel gear 39 which meshes with a second bevel gear 40 the shaft of which is connected to reversible fast repositioning electric motor 41.

In operation, when tracking the sun, the annulus gear 31 is held stationary by the second worm 35. The sun gear 30 rotates with rotation of the first worm 28 which causes the yoke 33 to rotate and with clutch 38 engaged the drive wheel 15 rotates to drive the shell 3. For precise backward movement the forward drive reciprocating motor is deenergized thus locking sun gear 30 and the reverse drive motor connected to the second worm 35 is activated. To rotate the annulus gear 31 and turn yoke 33, and drive wheel 15, in the opposite direction.

For fast re-positioning the clutch 38 is disengaged and the repositioning electric motor 41 drives wheel 15 either forwards or backwards.

The basic principle of control requires that the quadrant support 16 be kept in the azimuth plane of the sun at all times during the day. This is effected by pre-programming a microprocessor with data from astronomical tables, concerning the declination and the right ascension of the sun during the year. By making provision to feed the microprocessor digitized atmospheric date (i.e. pressure and temperature) and also international time signals it can determine what the bearing of the sun is at the site at any time. By making provision to allow the microprocessor to determine the bearing of the quadrant at any time it can compare the actual position of the quadrant with what is position should be and if they are different it can initiate corrective action.

Sensing the actual position of the quadrant could be effected by the use of an optical-electronic scanner reading a vernier in conjunction with graduations on the drive ring. The vernier and drive ring graduations would be suitably sensitized.

The setting of declination adjustor 20 can be made by a similar use of the microprocessor and positional sensing facilities.

The operation of the system is as follows:

At dawn on any day of the year the axis of truss 7 supporting the correction cone 6 and cassegrainian system 13 and 21 is aligned with a point on the horizon where the cenre of the sun is expected to rise. (The cone 6 is west of the central heat exchanger). At sunrise rotation of truss 7 through rotation of the shell is initiated at a speed equal to the rotation of the earth with respect to the sun at the particular time of the year. In the southern hemisphere rotation is clockwise looking South. Because the axis of rotation is inclined above the horizontal at an angle equal to the latitude of the site, the rotation maintains the cone axis aligned with the centre of the sun as it travels across the sky, provided the angle between the cone axis and the rotational axis is altered every 15 minutes or so during the day so that it is maintained essentially equal to the sun's declination at any time. Corrections to the rotational speed and axis angle are made automatically during the day in response to signals from a sensor on the truss.

The outcome of the above arrangement of the embodiment is that practically continuously during the day the axis of the correcting cone and paraboloid/hyperboloid system is pointing at the centre of the sun and throughout the day the system is backed by the full effective hemisphere. Thus for most of the day all direct radiation from the sun on a circular area of the hemisphere normal to the sun's rays is concentrated, minus reflection and other losses, on the central immobile heat exchanger. This radiation is absorbed by the heat exchanger and converted to heat which is transferred through an insulated steam line in the form of steam.

The quadrant support 16 may if desired be released from the drive ring by retracting the solenoid operated pin (not shown) provided on the quadrant support to permit relative movement between the shell and the quadrant support. If desired the quadrant support may be used to clean the surface of the shell and the portion of the bowl over which is passes. This can be achieved by the mounting of sprays and/or washing elements to the quadrant support. With the quadrant support locked with the shell only, the quadrant support and its washing action can be moved over the bowl. Similarly with the quadrant support released from the shell and locked with the bowl the shell can be moved past the quadrant support and its washing action.

It should be appreciated that if desired the hemisphere can be made as a single item without a movable shell portion. In such an instance the quadrant support would be movable around a horizontal path around the hemisphere by a drive able to cause its rotation relative to the hemisphere.

In addition the invention need not be limited to the use of a secondary reflector and is equally applicable to a collector utilising a linear focus by the collector or some other form of secondary reflector.

I claim:

1. A solar collector comprising a substantially hemispherical reflective concave surface, the diametric axis of said surface being inclined at an angle from the horizontal substantially equal to the angle of latitude of the location of the solar collector, said surface comprising a fixed lower portion and a rotatable upper portion, a drive for said upper portion for maintaining said surface substantially constantly directed towards the sun during its movement; a caustical conical concentrator located at the focus of said hemispherical reflective concave surface and having a concentrated second focus for radiation reflected onto its surface from said hemispherical reflective concave surface, a collector located at the second focus, said custical conical concentrator being mounted to rotate about a substantially North-South axis passing through said second focus and being driven by said drive for movement of said caustical conical concentrator around said lower portion in response to movement of said upper portion and for relative upward movement over said reflective concave surface with movement of the sun for deflection of incident solar radiation at said second focus.

2. A solar collector as claimed at claim 1 wherein the second focus is located at the centre of curvature of the reflective concave surface.

3. A solar collector as claimed at claim 1 wherein said caustical conical concentrator is rotatable about an East-West axis and further including a second drive for maintaining said caustical conical concentrator at said first focus as the sun varies its declination.

4. A solar collector as claimed at claim 1, wherein the caustical conical concentrator is associated with a concentrator positioned on the side of the second focus in opposed relation with the caustical conical concentrator and having as its focus the second focus.

5. A solar collector comprising a substantially hemispherical reflector, a collecting arrangement for receiving direct and reflected solar energy, supporting means supporting said collecting arrangement above said reflector for pivotal movement about the centre of curvature of said reflector, said supporting means including a semi-circular support, one end of said collecting arrangement being slidably supported on said semi-circular support, means for pivotably mounting said semi-circular support at one point below the centre of curvature of the reflector and for slidable movement upon said reflector at a second point spaced from said one point for movement along a circular, horizontally disposed path around said reflector, a first drive means for maintaining said collecting arrangement at a declination corresponding to the declination of the sun and second drive means for effecting rotation of said semi-circular support to maintain the inclination of the collecting arrangement in correspondence to the inclination of the sun.

6. A solar collector as claimed at claim 5 wherein said collecting arrangement comprises a linear collector located at the linear focus of said reflector.

7. A solar collector as claimed at claim 5 wherein said reflector comprises a fixed bowl having a horizontal upper edge and a shell defining a continuation of the surface of the bowl, means supporting said shell for rotation around the edge of the bowl about the centre of curvature of said bowl to permit variation in the direction faced by the open face of said reflector, said semi-circular support being fixed centrally to said shell and movable therewith, said shell being driven by said second drive.

8. A solar collector as claimed at claim 3 wherein latching means are provided between said semi-circular support and said shell for retaining said semi-circular support in a preset position relative to said shell, said latching means being disengageable from the shell to allow relative movement therebetween.

9. A solar collector as claimed at claim 5 wherein the collecting arrangement comprises a reflective caustical correction cone located at the focus of the hemisphere, said reflective caustical correction cone having a second focus located at the centre of curvature of said hemisphere and a collector located at the centre of curvature, said caustical correction cone being supported at said centre of curvature by a support structure.

10. A solar collector as claimed at claim 9 wherein said support structure supports a concentrator located to the side of the centre of curvature of the reflector in opposed relation to the caustical correction cone and has its focus located at the centre of curvature of said reflector and dimensioned to shadow said caustical correction cone from direct solar radiation.

11. A solar collector as claimed at claim 5 wherein the second drive comprises a two speed drive means capable of driving said semi-circular support in both directions in a slow controlled manner and capable of driving said semi-circular support rapidly in either direction.

12. A solar collector as claimed at claim 6 wherein said reflector comprises a fixed bowl having a horizontal upper edge and a shell defining a continuation of the surface of the bowl, means supporting said shell for rotation around the edge of the bowl about the centre of curvature of said bowl to permit variation in the direction faced by the open face of said reflector, said semi-circular support being fixed centrally to said shell and movable therewith, said shell being driven by said second drive.

13. A solar collector as claimed at claim 1 wherein latching means are provided between said semi-circular support and said shell for retaining said semi-circular support in a present position relative to said shell, said latching means being disengageable from the shell to allow relative movement therebetween.

14. A solar collector as claimed at claim 2 wherein latching means are provided between said semi-circular support and said shell for retaining said semi-circular support in a preset position relative to said shell, said latching means being disengageable from the shell to allow relative movement therebetween.

15. A solar collector as claimed at claim 14 wherein latching means are provided between said semi-circular support and said shell for retaining said semi-circular support in a preset position relative to said shell, said latching means being disengageable from the shell to allow relative movement therebetween.

16. A solar collector as claimed at claim 6 wherein the collecting arrangement comprises a reflective caustical correction cone located at the focus of the hemisphere, said reflective caustical correction cone having a second focus located at the centre of curvature and a collector located at the centre of curvature, said caustical correction cone being supported at said centre of curvature by a support structure.

17. A solar collector as claimed at claim 7 wherein the collecting arrangement comprises a reflective caustical correction cone located at the focus of the hemisphere, said reflective caustical correction cone having a second focus located at the centre of curvature and a collector located at the centre of curvature, said caustical correction cone being supported at said centre of curvature by a support structure.

18. A solar collector as claimed at claim 8 wherein the collecting arrangement comprises a reflective caustical correction cone located at the focus of the hemisphere, said reflective caustical correction cone having a second focus located at the centre of curvature and a collector located at the centre of curvature, said caustical correction cone being supported at said centre of curvature by a support structure.

19. A solar collector as claimed at claim 8 wherein the collecting arrangement comprises a reflective caustical correction cone located at the focus of the hemisphere, said reflective caustical correction cone having a second focus located at the centre of curvature and a collector located at the centre of curvature, said caustical correction cone being supported at said centre of curvature by a support structure.

* * * * *

UNITED STATES PATENT AND TRADEMARK OFFICE
CERTIFICATE OF CORRECTION

PATENT NO. : 4,590,920

DATED : May 27, 1986

INVENTOR(S) : Garrett M. Sainsbury

It is certified that error appears in the above-identified patent and that said Letters Patent is hereby corrected as shown below:

Column 4, line 35, after "ring" insert --2--.

Column 4, line 64, "rotatbly" should be --rotatably--.

Column 7, line 6, Claim 1, "custical" should be --caustical--.

Column 7, line 61, Claim 8, "3" should be --7--.

Column 8, line 31, Claim 13, "1" should be --5--.

Column 8, line 34, Claim 13, "present" should be --preset--.

Column 8, line 37, Claim 14, "2" should be --6--.

Column 8, line 43, Claim 15, "14" should be --12--.

Signed and Sealed this

Eighteenth Day of November, 1986

*Attest:*

DONALD J. QUIGG

*Attesting Officer*     *Commissioner of Patents and Trademarks*